United States Patent
Aasberg-Petersen et al.

(10) Patent No.: US 8,889,089 B2
(45) Date of Patent: *Nov. 18, 2014

(54) PROCESS FOR A REDUCTION IN THE AMOUNT OF SULPHUR COMPOUNDS, HYDROGEN CYANIDE, AND FORMIC ACID IN SYNTHESIS GAS

(75) Inventors: Kim Aasberg-Petersen, Allerød (DK); Ib Dybkjaer, Copenhagen (DK); Poul Erik Højlund Nielsen, Fredensborg (DK)

(73) Assignee: Haldor Topsoe A/S, Lyngby (DK)

( * ) Notice: Subject to any disclaimer, the term of this patent is extended or adjusted under 35 U.S.C. 154(b) by 811 days.

This patent is subject to a terminal disclaimer.

(21) Appl. No.: 12/739,677

(22) PCT Filed: Oct. 23, 2008

(86) PCT No.: PCT/EP2008/008961
§ 371 (c)(1),
(2), (4) Date: Apr. 23, 2010

(87) PCT Pub. No.: WO2009/053065
PCT Pub. Date: Apr. 30, 2009

(65) Prior Publication Data
US 2010/0311848 A1    Dec. 9, 2010

(30) Foreign Application Priority Data
Oct. 26, 2007    (DK) .................. 2007 01532

(51) Int. Cl.
*B01D 47/00* (2006.01)
*B01D 53/46* (2006.01)
(Continued)

(52) U.S. Cl.
CPC ........... *B01D 53/04* (2013.01); *C01B 2203/048* (2013.01); *B01D 2255/106* (2013.01); *C01B 2203/0425* (2013.01);
(Continued)

(58) Field of Classification Search
None
See application file for complete search history.

(56) References Cited

U.S. PATENT DOCUMENTS

| 4,360,504 A | 11/1982 | Blanck et al. |
| 4,521,387 A * | 6/1985 | Broecker et al. ............. 423/210 |

(Continued)

FOREIGN PATENT DOCUMENTS

| EP | 278063 A2 * | 8/1988 | ................ C01B 3/00 |
| EP | 757969 A1 * | 2/1997 | ................ C01B 3/58 |

(Continued)

OTHER PUBLICATIONS

Equipment Design and Cost Estimation for Small Modular Biomass Systems, Synthesis Gas Cleanup, and Oxygen Separation Equipment, National Renewable Energy Laboratory (NREL), Subcontract Report SR-510-39947, task 9, section 2.1.1, California, U.S.A. (May 2006), also available on http://www.nrel.gov/docs/fy06osti/39947.pdf.

(Continued)

*Primary Examiner* — Melvin C Mayes
*Assistant Examiner* — Michael Forrest
(74) *Attorney, Agent, or Firm* — Dickstein Shapiro LLP

(57) ABSTRACT

A process for a reduction in the amount of sulphur compounds, hydrogen cyanide, formic acid and formic acid derivatives in synthesis gas comprising these compounds, the process comprising contacting the synthesis gas with a sulphur absorbent comprising material and thereafter with a catalyst comprising one or more metals selected from the group consisting of silver, gold, copper, palladium, platinum and their mixtures and supported on a carrier comprising at least one of the oxides of scandium, yttrium, lanthanum, cerium, titanium, zirconium, aluminum, zinc, chromium and molybdenum.

11 Claims, 1 Drawing Sheet

(51) Int. Cl.
| | |
|---|---|
| *B01D 53/56* | (2006.01) |
| *B01J 8/00* | (2006.01) |
| *C01B 21/00* | (2006.01) |
| *B01D 53/14* | (2006.01) |
| *C01C 3/00* | (2006.01) |
| *B01D 53/86* | (2006.01) |
| *B01D 53/52* | (2006.01) |
| *C01B 17/00* | (2006.01) |
| *C01B 7/00* | (2006.01) |
| *C01B 3/58* | (2006.01) |
| *C01B 3/56* | (2006.01) |
| *B01D 53/04* | (2006.01) |

(52) U.S. Cl.
CPC ... *B01D 2253/112* (2013.01); *C01B 3/58* (2013.01); *C01B 2203/0485* (2013.01); *B01D 2257/30* (2013.01); *C01B 3/56* (2013.01); *C01B 2203/0435* (2013.01); *B01D 53/8603* (2013.01); *B01D 2253/104* (2013.01); *B01D 2255/104* (2013.01); *C01B 2203/0465* (2013.01); *B01D 2255/1023* (2013.01); *C01B 2203/0475* (2013.01)
USPC ........ 423/210; 423/235; 423/236; 423/239.1; 423/242.1; 423/244.01

(56) References Cited

U.S. PATENT DOCUMENTS

| | | | | |
|---|---|---|---|---|
| 5,441,990 | A | * | 8/1995 | Robin et al. .................. 518/703 |
| 5,685,890 | A | * | 11/1997 | Okada et al. ................ 48/214 A |
| 6,107,353 | A | | 8/2000 | Koveal et al. |
| 7,846,325 | B2 | * | 12/2010 | Van Hardeveld et al. ..... 208/247 |
| 2002/0147103 | A1 | * | 10/2002 | Ruettinger et al. ............. 502/66 |
| 2004/0175327 | A1 | * | 9/2004 | Hagemeyer et al. .......... 423/656 |
| 2009/0074643 | A1 | | 3/2009 | Pedersen et al. |

FOREIGN PATENT DOCUMENTS

| | | | |
|---|---|---|---|
| EP | 1 034 832 | 9/2000 | |
| GB | 939254 | 10/1963 | |
| GB | 2 002 809 A | 2/1979 | |
| WO | WO/2005/063384 | 7/2005 | |
| WO | WO-2006/008317 A1 * | 1/2006 | ............ B01D 53/86 |
| WO | WO 2007/082896 A1 | 7/2007 | |

OTHER PUBLICATIONS

N. Hickey et al.; "Improvement of $SO_x$-Resistance of Silver Lean-$DeNO_x$ Catalysts by Supporting on $CeO_2$-Containing Zirconia," *Journal of Catalysis*, vol. 209; No. 1, 2002; pp. 271-274.

* cited by examiner

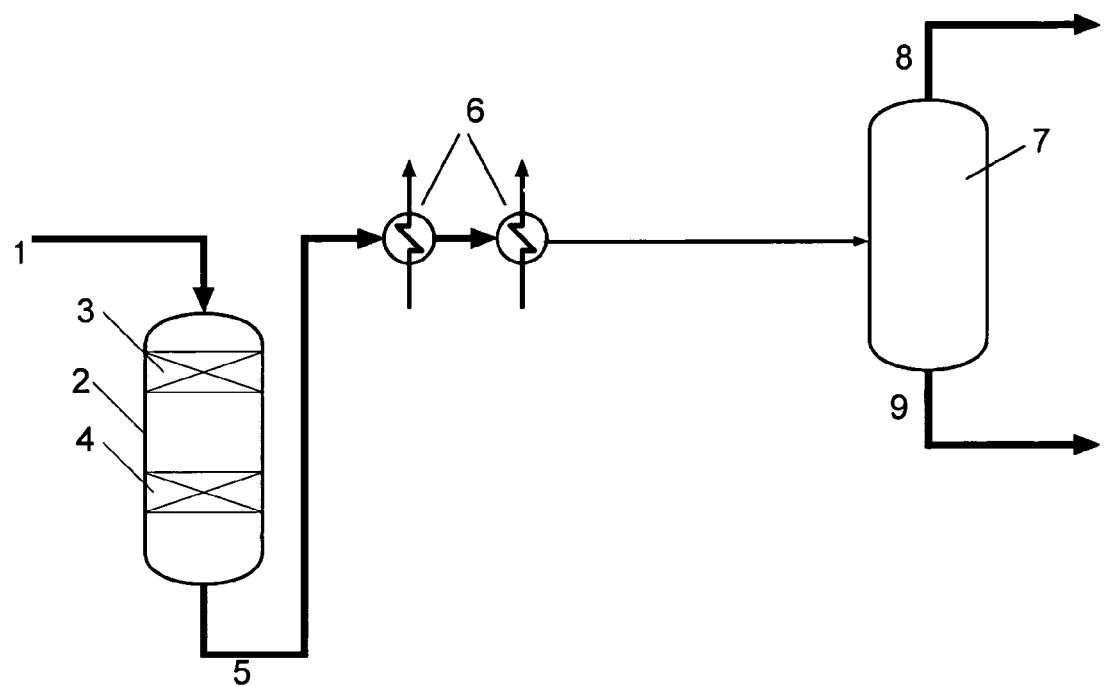

PROCESS FOR A REDUCTION IN THE AMOUNT OF SULPHUR COMPOUNDS, HYDROGEN CYANIDE, AND FORMIC ACID IN SYNTHESIS GAS

This invention deals with a reduction in the amount of sulphur compounds, hydrogen cyanide and formic acid and its derivatives present in synthesis gas to produce a gas suitable for production of other compounds such as methanol, dimethyl ether or hydrocarbons. In particular, the invention concerns the reduction of these impurities via absorption of the sulphur compounds followed by catalytic treatment of the synthesis gas.

BACKGROUND OF THE INVENTION

Synthesis gas for production of for instance methanol, dimethyl ether (DME) or liquid hydrocarbons via for instance Fischer-Tropsch synthesis, may be produced from carbon-containing feedstock such as natural gas, LPG, liquid hydrocarbons including heavy hydrocarbons, or solid feedstock such as coal. The carbon-containing feedstock is reacted with steam and/or air, enriched air, or oxygen at high temperature during steam reforming, autothermal reforming, catalytic partial oxidation or combinations thereof.

In the conventional steam reforming process natural gas or light hydrocarbons are reacted with steam in the presence of a catalyst based on nickel or noble metals. Temperatures at the reactor outlet of up to 950° C. are obtained. During autothermal reforming (ATR) or catalytic partial oxidation (CPO), natural gas or light hydrocarbons are reacted with steam and an oxidant (air, enriched air, or oxygen) in the presence of a catalyst based on nickel or noble metals. Temperatures up to 1100° C. are usually obtained at the outlet of the reactor. During non-catalytic partial oxidation (POX) of natural gas, light hydrocarbons, heavy hydrocarbons or solid feedstock such as coal (also referred to as gasification) is reacted with an oxidant (air, enriched air or oxygen) and outlet temperatures from the reactor of up to 1400° C. are obtained.

These processes are well known to those experienced in the art. A comprehensive description of the individual processes and relevant variations and combinations thereof is given by e.g. Aasberg-Petersen et al. Fischer-Tropsch Technology, Stud. Surf. Sci. Catal. 152 (2004) 258-405, edited by Steynberg, A. P. and Dry, M. E.

In processes based on steam reforming and/or autothermal reforming or catalytic partial oxidation the composition of the synthesis gas may be an equilibrium mixture of hydrogen, carbon monoxide, carbon dioxide, methane and steam established at the outlet temperature and pressure of the last catalytic reactor according to the reactions:

Steam reforming: $CH_4 + H_2O = CO + 3H_2$    (1)

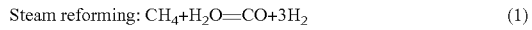

Water Gas Shift: $CO + H_2O = CO_2 + H_2$    (2)

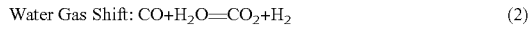

In partial oxidation the equilibrium may be established at a temperature somewhat lower than the outlet temperature from the reactor. Hydrocarbons other than $CH_4$ will generally be present in synthesis gas produced by any of the methods only in small or insignificant amounts. However, certain other components may also be present in trace amounts as impurities with possible detrimental effects in downstream processes, especially if the feedstock or the oxidant contains nitrogen.

Impurities of special interest are ammonia, hydrogen cyanide, formic acid, and sulphur compounds (abbreviated S-compounds), especially hydrogen sulphide ($H_2S$) and carbonyl sulphide (COS). Ammonia, hydrogen cyanide, and formic acid will be present in amounts corresponding to establishment of equilibrium (at the same conditions as the equilibrium for reactions (1) and (2)) for the following reactions:

$3H_2 + N_2 = 2NH_3$    (3)

$CO + NH_3 = HCN + H_2O$    (4)

$CO + H_2O = HCOOH$    (5)

The concentration of ammonia may be up to a few hundred vol ppm, whereas the concentration of hydrogen cyanide and formic acid will normally be less than 100 vol ppm.

In cases where the synthesis gas is produced by steam reforming, autothermal reforming or catalytic partial oxidation over a catalyst, all sulphur is usually removed from the feedstock, because it is a poison for the catalysts employed in these processes. In other cases sulphur is not completely removed before the autothermal reforming step or the catalytic partial oxidation step. In cases where the synthesis gas is produced by partial oxidation, sulphur is usually not removed from the feedstock, and the total concentration of sulphur compounds in the synthesis gas thus depends on the amount of sulphur (in any form) in the feedstock.

The ratio between hydrogen sulphide and carbonyl sulphide corresponds to establishment of equilibrium for the reaction:

$CO_2 + H_2S = COS + H_2O$    (6)

The equilibrium is established at the same conditions as for reaction (1)-(5).

After leaving the reactor, where the synthesis gas is formed, the raw synthesis gas is cooled in one or more steps to a temperature where most of its content of water vapour condenses. The first cooling step can be used to produce steam followed by cooling in air and/or water cooling.

The synthesis gas is often rich in carbon monoxide, and this may induce risk of carbon formation on catalysts or metal dusting corrosion on the equipment in the cooling section. These risks are known to be reduced by the presence of sulphur compounds. Therefore, if the feedstock is treated before the conversion to synthesis gas by removal of sulphur, sulphur containing compounds may in certain cases be added before partial or full conversion of the feedstock or before the cooling of the synthesis gas in order to reduce the risk for carbon formation on catalysts or for metal dusting in the cooling section.

After cooling of the synthesis gas, condensate is separated, and the synthesis gas is sent to the section for synthesis of the final product e.g. methanol or dimethyl ether (DME) or hydrocarbons. The condensate will comprise dissolved gases including carbon oxides, most of the ammonia, and almost all of the formic acid. The pH of the condensate will typically be around 7.

Hydrogen cyanide and hydrogen sulphide will at this pH not be dissociated in the water, and they will, together with carbonyl sulphide and other non-dissociated gases, be distributed between gas and condensate according to the relevant vapour/liquid equilibria. The synthesis gas will thus, in addition to the main components hydrogen, carbon monoxide, carbon dioxide and methane, contain traces of ammonia, hydrogen cyanide, and sulphur compounds, abbreviated S-compounds. The condensate will contain the dissolved gases comprising ammonia, hydrogen cyanide, S-compounds and formic acid.

The content of ammonia, hydrogen cyanide, S-compounds and formic acid in both the synthesis gas and the condensate may cause problems in downstream process steps. In synthesis of methanol or DME, ammonia and hydrogen cyanide will be converted to methyl amines, which are undesired in the products and must be removed, e.g. by ion exchange. A more serious effect is seen in hydrocarbon synthesis by Fischer-Tropsch reactions, especially when catalysts based on Co are used, see e.g. U.S. Pat. No. 6,107,353. In such cases, ammonia and hydrogen cyanide may act as catalyst poisons by unfavourably affecting the activity and selectivity of the synthesis catalyst. S-compounds are strong catalyst poisons and cannot be tolerated at more than very low concentrations, in some cases below a total concentration of 60 ppb (Equipment Design and Cost Estimation for Small Modular Biomass Systems, Synthesis Gas Cleanup, and Oxygen Separation Equipment, National Renewable Energy Laboratory (NREL), Subcontract Report SR-510-39947, task 9, section 2.1.1, California, U.S.A. (May 2006), also available on http://www.nrel.gov/docs/fy06osti/39947.pdf) or lower. The presence of ammonia, hydrogen cyanide and sulphur compounds in the synthesis gas is thus undesirable. The content of ammonia depends strongly on the temperature in the condensate separator; it is highest when the temperature is relatively higher. However, the traces of ammonia are easily removed by washing with water. Hydrogen cyanide and the sulphur compounds in the synthesis gas are more difficult to remove since their solubility in water is limited at the prevailing conditions.

The condensate is most often purified by flashing and/or stripping with steam followed by final purification by ion exchange. A survey of various concepts for stripping of process condensate may be found in J. Madsen: Ammonia Plant Saf. 31 (1991) 227-240.

Hydrogen cyanide may be removed by flashing or low temperature steam stripping (with low pressure steam at 100-120° C.) together with other dissolved gases including ammonia and carbon dioxide in so-called overhead gases. However, hydrogen cyanide may cause undesirable corrosion in the equipment, even when this is made from stainless steel. If the stripping is done at higher temperature, e.g. by stripping with medium pressure steam at 230-250° C., hydrogen cyanide may be converted to formic acid by the following reactions:

$$HCN + H_2O \rightleftharpoons HCONH_2 \quad (7)$$

$$HCONH_2 + H_2O \rightleftharpoons HCOOH + NH_3 \quad (8)$$

Formic acid will not be removed by the stripping process. It must be removed by the final purification by ion exchange and constitutes a major part of the load on this process step and thus of the consumption of chemicals required for regeneration of the ion exchange resin.

It is thus evident that it is desirable to remove hydrogen cyanide from the wet synthesis gas before water vapour is condensed so that the content of hydrogen cyanide in both the dry synthesis gas and the process condensate is reduced. It is further evident that this removal or reduction of hydrogen cyanide is preferably done in such a way that the reactions (7) and (8) do not take place in the gas phase, leading to increased content of formic acid in the process condensate. Most preferable is a process which in addition to the removal of hydrogen cyanide from the synthesis gas also removes the formic acid formed in the synthesis gas generator by reaction (5). Such removal of formic acid can be effected by a process which in addition to the decomposition of hydrogen cyanide according to reaction (4), which is reversed at lower temperatures, also decomposes formic acid, e.g. according to the following reaction:

$$HCOOH \rightarrow CO_2 + H_2 \quad (9)$$

U.S. Pat. No. 4,521,387 discloses a process for purifying gases containing CO and/or $CO_2$ by removing sulphur compounds, free unreacted oxygen, hydrogen cyanide, hydrogen chloride, mercury and other compounds. The gas to be purified is passed directly through a catalyst charge containing a Cu/ZnO catalyst prepared by the thermal decomposition of a mixed crystalline compound of zinc hydroxide carbonate. The removal of sulphur compounds, metal carbonyls and hydrogen cyanide by the catalyst is shown in process steps that either include passage through the catalyst alone or passage through active carbon followed by passage through the catalyst. There is no indication of the catalyst's ability to remove the other compounds mentioned.

It is also desirable that reactions such as methanation (the reverse of reaction (1)) or the shift reaction (reaction (2)) are not promoted.

These reactions are undesirable since they could change the overall composition of the synthesis gas in an undesirable way and, especially in the case of Fischer-Tropsch synthesis using catalysts based on Co, cause loss of production capacity. However, the potential problems caused by the presence of the sulphur compounds also need to be reduced. Moreover, the presence of sulphur compounds in the feed to the process will be detrimental to the performance of the process itself, since sulphur is a poison to the catalyst employed in the process. Therefore, it is desirable to remove the sulphur compounds from the synthesis gas before it is further processed for removal of hydrogen cyanide and formic acid and its derivatives.

It is an objective of the invention to provide a process, by which the content of sulphur compounds, hydrogen cyanide and formic acid and formic acid derivatives, is simultaneously reduced or removed from synthesis gas.

SUMMARY OF THE INVENTION

The process of the invention concerns the reduction in the amount of sulphur compounds (abbreviated to S-compounds), hydrogen cyanide and formic acid and formic acid derivatives from synthesis gas. It has surprisingly been possible to develop a process which reduces the amounts of S-compounds by absorption and catalytically decomposes hydrogen cyanide according to the reverse of reaction (4) and formic acid according to reaction (9) without promoting undesirable reactions such as methanation (the reverse of reaction (1)) or the shift reaction (reaction (2)).

The process of the invention comprises contacting the synthesis gas first with a material which absorbs S-compounds from the synthesis gas according to the reactions (10) and (11) using for instance zinc oxide:

$$H_2S + ZnO \rightleftharpoons H_2O + ZnS \quad (10)$$

$$COS + H_2O \rightleftharpoons CO_2 + H_2S \quad (11)$$

and subsequently contacting the synthesis gas with a catalyst suitable for reduction in the amount of hydrogen cyanide, formic acid and formic acid derivatives and sulphur remnants.

Accordingly, the above objective is achieved by the invention process for a reduction in the amount of sulphur compounds, hydrogen cyanide, formic acid and formic acid derivatives in synthesis gas comprising these compounds, the process comprising contacting the synthesis gas with a material comprising sulphur absorbent component for instance zinc oxide, and thereafter with a catalyst comprising one or more metals selected from the group consisting of silver, gold, copper, palladium, platinum and their mixtures and supported on a carrier comprising at least one of the oxides of scandium, yttrium, lanthanum, cerium, titanium, zirconium, aluminium, zinc, chromium and molybdenum.

The above objective is also achieved by the inventive process for the preparation of methanol and/or dimethyl ether, or for the preparation of hydrocarbons in gaseous or liquid form from synthesis gas, the process comprising contacting synthesis gas comprising sulphur compounds, hydrogen cyanide, formic acid and formic acid derivatives, with a sulphur absorbent comprising material and thereafter with a catalyst comprising one or more metals selected from the group consisting of silver, gold, copper, palladium, platinum and their mixtures and supported on a carrier comprising at least one of the oxides of scandium, yttrium, lanthanum, cerium, titanium, zirconium, aluminium, zinc, chromium and molybdenum, to obtain synthesis gas from which the amount of sulphur compounds, hydrogen cyanide, formic acid and formic acid derivatives has been reduced, and further processing the obtained synthesis gas to methanol, dimethyl ether and/or hydrocarbons in gaseous or liquid form.

Furthermore, the objective is achieved by the invention concerning a process for the preparation of hydrocarbons in liquid form from synthesis gas, the process comprising contacting synthesis gas comprising sulphur compounds, hydrogen cyanide, formic acid and formic acid derivatives, with a sulphur absorbent comprising material and thereafter with a catalyst comprising one or more metals selected from the group consisting of silver, gold, copper, palladium, platinum and their mixtures and supported on a carrier comprising at least one of the oxides of scandium, yttrium, lanthanum, cerium, titanium, zirconium, aluminium, zinc, chromium and molybdenum, to obtain synthesis gas from which the amount of sulphur compounds, hydrogen cyanide, formic acid and formic acid derivatives has been reduced, and further processing the obtained synthesis gas to hydrocarbons in liquid form by the Fischer-Tropsch process.

SUMMARY OF THE DRAWING

The FIGURE shows an embodiment of the process of the invention.

DETAILED DESCRIPTION OF THE INVENTION

The process of the invention relates to the reduction in the amount of S-compounds, hydrogen cyanide, and formic acid in synthesis gas.

By reduction is meant a decrease in the concentration of S-compounds, hydrogen cyanide, formic acid and formic acid derivatives in synthesis gas which has been treated and cleaned by the process of the invention, when compared to the concentration of these same compounds in the untreated synthesis gas.

By S-compounds is meant any compound containing sulphur especially hydrogen sulphide and carbonyl sulphide.

By formic acid is also meant derivatives of formic acid in the form of formamide, formates such as salts formed from the neutralisation of formic acid with a base or as an ester derived from formic acid. The formate ion has the formula $HCOO^-$.

In an embodiment of the invention the catalyst comprises one or more metals selected from the group consisting of silver, gold, palladium, platinum and their mixtures.

In an embodiment of the invention the carrier comprises at least one of the oxides of cerium, titanium, zirconium, aluminium, zinc and molybdenum.

In an embodiment of the invention the sulphur absorbent comprising material comprises zinc oxide or titanium oxide or their mixtures.

In an embodiment of the invention the sulphur absorbent comprising material comprises zinc oxide promoted with alumina.

In an embodiment of the invention the catalyst comprises silver supported on an oxide of zinc and the sulphur absorbent comprising material comprises zinc oxide.

In an embodiment of the invention the sulphur absorbent comprising material comprises zinc oxide and the catalyst comprises silver supported on a carrier comprising at least one of the oxides of titanium and zirconium.

In an embodiment of the invention the synthesis gas is contacted with the sulphur absorbent comprising material and thereafter the catalyst at temperatures ranging from 150° C. to 400° C. and pressures ranging from 1-100 bars.

In an embodiment of the invention the synthesis gas after reduction of the amount of sulphur compounds, hydrogen cyanide, formic acid and formic acid derivatives, is cooled and separated into a cleaned synthesis gas stream and a condensate stream.

In an embodiment of the invention the catalyst is produced by impregnation of the carrier with the one or more metals followed by drying and calcining, or by mixing and kneading the carrier with the one or more metals followed by extrusion and calcination.

In an embodiment of the invention the one or more metals are in the form of an aqueous solution.

In an embodiment of the invention, the amount of sulphur compounds, hydrogen cyanide, formic acid and formic acid derivatives in synthesis gas prepared by autothermal reforming is treated by the process of the invention to obtain synthesis gas with reduced amounts of these compounds, and further processed to hydrocarbons in liquid form by the Fischer Tropsch process.

The process of the invention employs a sulphur absorbent comprising material for the removal of the S-compounds and a specific catalyst for the simultaneous decomposition of hydrogen cyanide and formic acid present in synthesis gas and removal of small amounts of S-compounds. The sulphur absorbent comprising material converts carbonyl sulphide to hydrogen sulphide and absorbs hydrogen sulphide. The sulphur absorbent comprising material must not promote the undesired formation of methane (the reverse of reaction (1)), the shift reaction (reaction 2) or the formation of formic acid by reaction (5).

Preferred sulphur absorbents are zinc oxide (ZnO) or ZnO promoted with aluminia ($Al_2O_3$). Hydrogen sulphide is by the absorption converted to zinc sulphide as shown in reaction (10).

The capability of sulphur absorbents such as zinc oxide and materials comprising for instance zinc oxide to absorb sulphur from gases containing S-compounds in dry gas proceeds according to two processes.

The first absorption process results in bulk conversion of the metal oxide to the metal sulphide for instance according to reactions (10) and (11). These reactions proceed to an equilibrium ratio between hydrogen sulphide and steam depending on the temperature. As examples the equilibrium ratio between hydrogen sulphide and steam depending on the temperature. As examples the equilibrium ratio for conversion of zinc oxide to zinc sulphide is $1.8 \times 10^{-9}$ at 150° C. and $16 \times 10^{-9}$ at 200° C., respectively.

In the second process, S-compounds are chemisorbed on the free metal oxide surface. This process is not limited by any equilibrium and may in principle proceed to complete removal of the S-compounds. However, in the chemisorption, the S-compounds compete with steam, and in wet gas the free metal surface sites are blocked by chemisorbed water molecules, so that no chemisorption of S-compounds takes place. Therefore, in wet gas, S-compounds are only removed to the equilibrium hydrogen sulphide to steam ratio according to reactions (10) and (11).

When more efficient removal of S-compounds is desired, it is thus necessary, when the gas is wet, to remove or further reduce the last traces of the S-compounds by other means than by absorption on a metal oxide.

In accordance with the process of the invention the last traces of the S-compounds in the wet gas are removed or further reduced by bringing the wet gas into contact with materials exposing free metal surface. In the process of the invention the free metal surface is obtained by contacting the synthesis gas with a catalyst comprising metals of e.g. silver, gold, copper, palladium, platinum or their mixtures.

It is advantageous to remove or further reduce the last traces of the S-compounds because even very small amounts of S-compounds (single digit ppb levels) may act as a poison for downstream synthesis catalysts such as a methanol synthesis catalyst or Fischer-Tropsch synthesis catalysts.

Besides reducing the amount of S-compounds contained in the synthesis gas obtained from the bed with sulphur absorbent comprising material, the catalyst catalyses the hydrolysis of hydrogen cyanide and the decomposition of formic acid and its derivatives via a dehydrogenation reaction. Hydrogen cyanide is converted to ammonia and carbon monoxide, and formic acid and its derivatives are converted to carbon dioxide and hydrogen.

The catalyst comprises at least one of the metals silver, gold, copper, palladium, platinum and their mixtures. The metal is supported on a carrier selected from the group of oxides of scandium, yttrium, lanthanum, cerium, titanium, zirconium, aluminium, zinc, chromium, molybdenum and mixtures thereof. Application of this catalyst in the process of the invention results in reduced amounts of S-compounds, hydrogen cyanide and formic acid and derivatives in the treated synthesis gas as compared to the untreated synthesis gas.

The catalyst comprises the metal at concentrations of 0.01 to 40 wt %. Preferable is 0.05 to 20 wt %. Preferably the metals are palladium or silver and most preferably the metal is silver.

The catalyst comprises the carriers prepared from at least one of the oxides of scandium, yttrium, lanthanum, cerium, titanium, zirconium, aluminium, zinc, chromium, molybdenum and their mixtures. Preferable are carriers based on at least one of the oxides of cerium, zinc, zirconium, aluminium, molybdenum, titanium and their mixtures. Most preferable are carriers of titania or titanium dioxide $TiO_2$ and zirconia or zirconium oxide $ZrO_2$ or their mixtures. The pure compounds or commercially available products are useful in the preparation of all the carriers.

All forms of titania are useful for example titania in anatase form.

The catalyst used in the process of the invention can be produced by impregnation of a calcined porous oxide carrier with the metals or by mixing and kneading the components (i.e. the carrier and the metal) followed by extrusion and calcination. The metals can be used in the form of an aqueous solution. The concentration of the aqueous solutions depends on the desired metal concentration in the final catalyst and the pore volume of the catalysts, which can range from 230-600 ml/kg catalyst carrier. The surface area can range from 64-250 and has no marked effect on the results.

The wet impregnated catalysts can thereafter be dried, for instance at 100° C. for 1 hour, followed by calcination, for instance at 500° C. for 2 hours.

These two preparation methods have the advantage of involving few process steps and they allow the use of commercially available raw materials.

A preferable embodiment of the invention is the process utilising a catalyst comprising silver deposited on titanium oxide and/or zirconium oxide. These catalysts are particularly effective for the simultaneous removal of both hydrogen cyanide and formic acid and its derivatives. Small amounts of S-compounds are also removed or further lowered by this catalyst.

The absorption of S-compounds and the hydrolysis reactions are carried out at essentially the same conditions, at temperatures of 100-400° C. and pressures of 1-100 bars. More preferable is a temperature of 50-350° C. and a pressure of 1-80 bars. Most preferable is a temperature of 100-250° C. and a pressure of 10-80 bars. This temperature range is optimal as the water gas shift reaction can then be essentially avoided, and the pressures are applicable for the further preparation of methanol or DME or liquid hydrocarbon synthesis via the Fischer-Tropsch process. The lower temperatures are generally determined by the dew point of the reactant mixture, which normally is in the range from 50-200° C.

The process of the invention is carried out by first passing the synthesis gas to be purified through the sulphur absorbent comprising material and thereafter through the catalyst. The sulphur absorbent comprising material and the catalyst may be in separate reactors, or they may be placed in one reactor in two separate beds or in one bed with the sulphur absorbent comprising material placed on top of the catalyst.

After ended absorption of S-compounds and hydrolysis of hydrogen cyanide and decomposition of formic acid the process gas can be cooled in one or more steps and separated into a synthesis gas stream suitable for further processing to for instance methanol, dimethyl ether and/or liquid hydrocarbons and a condensate stream containing dissolved gases. The condensate stream can be sent to a stripper for further separation of the components.

The FIGURE shows a preferred embodiment of the invention. Untreated synthesis gas 1 with main components carbon monoxide, carbon dioxide and hydrogen and contaminated with S-compounds, hydrogen cyanide and formic acid and formic acid derivatives is transferred to a reactor 2. In this reactor, the gas first contacts a bed of sulphur absorbent comprising material 3 and thereafter a bed of catalyst 4 for the catalytic hydrolysis of hydrogen cyanide to carbon monoxide and ammonia, the simultaneous decomposition of formic acid to carbon dioxide and hydrogen and further reduction of S-compounds. The process gas 5 from the reactor 2 is cooled in one or more cooling steps 6 to a temperature below the temperature required for water vapour condensation. The heat generated during the cooling steps can be used for instance for the production of steam or possibly as heat source in heat exchange reformers for heating of boiler feed water or for other purposes.

The cooled process gas 5 is then transferred to a separator 7 for separation into two streams: a cleaned synthesis gas stream 8 suitable for further conversion and a condensate stream 9. The condensate stream 9 can be further purified by transferring it to for instance a stripper for removal of carbon dioxide, ammonia and other dissolved gases. The contents of S-compounds, hydrogen cyanide and formic acid and its derivatives are reduced compared to their content in untreated synthesis gas.

The cleaned synthesis gas stream is suitable for further conversion to for instance methanol and/or dimethyl ether. It can also be used as a starting material for the synthesis of hydrocarbons in gaseous or liquid form for instance via the Fischer-Tropsch process.

The concentration of S-compounds in the synthesis gas is reduced to less than 50 vol ppb, preferably to less than 10 vol ppb and most preferably to less than 5 vol ppb in the dry gas. The amount of hydrogen cyanide in the synthesis gas is reduced by at least 80% preferably 90% and most preferably 95% using the process of the invention. Likewise the amount of formic acid and derivatives in the synthesis gas and the condensate is reduced by more than 10%, preferably more than 25% and most preferably by more than 50% using the process of the invention.

Examples

Example 1

A gas containing 10 vol ppm $H_2S$ and 20 vol % steam is contacted with zinc oxide at 200° C. The concentration of S-compounds obtained in the synthesis gas was 3.2 vol ppb in the dry gas.

Example 2

A gas containing 10 vol ppm $H_2S$ and 50 vol % steam is contacted with zinc oxide at 200° C. The concentration of S-compounds obtained in the synthesis gas was 10 vol ppb in the dry gas.

Procedure for Examples 3 to 12

Experiments with different catalysts were carried out using a synthesis gas consisting mainly of hydrogen, carbon monoxide, carbon dioxide having a composition corresponding to that of a synthesis gas from an autothermal reforming unit.

The impurities were prepared as follows: hydrogen cyanide was produced by acid distillation of sodium cyanide. The formic acid used was a 32% formic acid solution of an analytical grade. The ammonia used was a 25% ammonia solution (analytical grade).

The impurities hydrogen cyanide, ammonia and formic acid were then added to the feed water to the evaporator to the test unit. The amounts of impurities in the synthesis gas corresponded to the amounts expected in a synthesis gas from an autothermal reforming unit. The resulting steam with the content of impurities from the evaporator was mixed with the synthesis gas to form a test gas tested in the test unit.

In all the examples the gas composition is given in either vol %, volume ppb or volume ppm.

The composition of the test gas is shown in Table 1.

TABLE 1

| Components of test gas | | Concentration | |
| --- | --- | --- | --- |
| | | Examples 3-4 | Examples 5-12 |
| $H_2$ | [%] | 45-60 | 45-60 |
| $H_2O$ | [%] | 10-20 | 15-25 |
| CO | [%] | 23-36 | 25-30 |
| $CO_2$ | [%] | 2-3 | 0 |

TABLE 1-continued

| Components of test gas | | Concentration | |
| --- | --- | --- | --- |
| | | Examples 3-4 | Examples 5-12 |
| Ar | [%] | 0-3 | 0 |
| Total | [%] | 100 | 100 |
| Impurities: | | | |
| HCN | ppb | 1700-4500 | 7000-12000 |
| HCOOH | ppb | 300-1900 | 13000-18000 |
| $NH_3$ | ppm | 164 | 164 |

The experiments were carried out at 1-28 bars in the temperature range of 150-350° C.

The concentrations of the CO, formic acid and derivatives and hydrogen cyanide in the wet gas were calculated on basis of the feed flow of dry gas and water and the dry gas analysis of the inlet and the exit gas of the reactor.

The ratios for CO, HCN and HCOOH are as follows:

CO ratio=$CO_{exit}/CO_{inlet}$

HCN ratio=$HCN_{exit}/HCN_{inlet}$

HCOOH ratio=$HCOOH_{exit}/HCOOH_{inlet}$

The ratio for HCOOH covers both formic acid and its derivatives.

Formic acid and its derivatives are found in the liquid phase after condensation of the wet gas. The concentration in the liquid phase is determined by ion chromatography, with a detection limit of about 0.1 mg/l.

Hydrogen Cyanide is found both in the aqueous phase and in the gas phase after condensation of the wet gas. The gas phase concentration of HCN was measured by absorption in an impinger bottle with alkaline liquid having a pH higher than 12. The absorption was performed for a specified time, and the volume of gas after the absorption was measured with a gasometer. The amount absorbed in the impinger bottle was found by ion selective chromatography with a detection limit of about 0.1 mg/l.

The water phase condensate was sampled in a bottle with 1 grain solid NaOH in order to prevent HCN from escaping the liquid upon expansion. The sample was analyzed likewise.

The catalysts tested were produced by impregnation of the calcined porous oxide carrier with the metals or by mixing and kneading the components followed by extrusion and calcination. The metals were used in the form of an aqueous solution. The concentration of the aqueous solutions was dependant on the desired metal concentration in the final catalyst and the pore volume of the catalysts, which was ranging from 230-600 ml/kg catalyst carrier. The surface area was ranging from 64-250 and had no marked effect on the results.

The wet impregnated catalysts were dried at 100° C. for 1 hour followed by calcination at 500° C. for 2 hours.

Example 3

7 wt % silver on titania was made by impregnation of porous 3 mm titania pellets with an aqueous solution containing 22.1 g silver nitrate per 100 ml solution. The impregnated titania was dried at 110° C. followed by decomposition of the silver nitrate at 500° C. for 1 hour. The catalyst was tested at both low and high space velocity. The results are shown in Table 2.

TABLE 2

7 wt % Ag/TiO$_2$ Catalyst

| | | | |
|---|---|---|---|
| Temperature | ° C. | 322 | 322 |
| Pressure | bar | 25 | 25 |
| Catalyst volume | Ml | 5.30 | 5.30 |
| Space velocity | Nl/l/h | 35640 | 3573 |
| INLET GAS COMPOSITION WET | | | |
| H$_2$ | % | 47.1 | 45.5 |
| CO | % | 35.5 | 34.2 |
| CO$_2$ | % | 2.5 | 2.5 |
| H$_2$O | % | 14.9 | 17.8 |
| HCN in wet gas | ppb | 3450 | 4126 |
| HCOOH | ppb | 2741 | 3278 |
| EXIT GAS COMPOSITION WET | | | |
| CO | % | 34.4 | 27.6 |
| HCN | ppb | 26 | 138 |
| HCOOH | ppb | 1225 | 1186 |
| CO ratio | | 0.969 | 0.807 |
| HCN ratio | | 0.008 | 0.033 |
| HCOOH ratio | | 0.447 | 0.362 |

The addition of silver to TiO$_2$ reduces the concentration of formic acid and derivatives as shown in Table 2 by more than 60%.

There is some water gas shift reaction taking place on the catalyst.

Example 4

Example 3 was repeated at a lower temperature at both low and high space velocity using 7 wt % Ag on TiO$_2$ using 3-9 mm pellets. The results are shown in Table 3.

TABLE 3

7 wt % Ag/TiO2 Catalyst

| | | | |
|---|---|---|---|
| Temperature | ° C. | 182 | 181 |
| Pressure | bar | 25 | 25 |
| Catalyst volume | ml | 5 | 5 |
| Space velocity | Nl/l/h | 35449 | 3311 |
| INLET GAS COMPOSITION WET | | | |
| H$_2$ | % | 47.1 | 44.7 |
| CO | % | 35.4 | 33.7 |
| CO$_2$ | % | 2.5 | 2.4 |
| H$_2$O | % | 15.0 | 19.2 |
| HCN in wet gas | ppb | 3465 | 4452 |
| HCOOH | ppb | 2753 | 3537 |
| EXIT GAS COMPOSITION WET | | | |
| CO | % | 35.3 | 33.4 |
| HCN | ppb | 373 | 41 |
| HCOOH | ppb | 762 | 1392 |
| CO ratio | | 0.997 | 0.991 |
| HCN ratio | | 0.108 | 0.009 |
| HCOOH ratio | | 0.277 | 0.394 |

The results indicated that the content of HCN and formic acid and its derivatives were effectively reduced. The shift reaction was also less prevalent.

Example 5

An Ag/Y$_2$O$_3$/Al$_2$O$_3$ catalyst was prepared as follows: 40 g Y$_2$O$_3$ was mixed with 25 g alumina gel and 1.8 g AgNO$_3$ dissolved in 1 ml H2O. The mixture was kneaded to a paste, which was extruded. The extrudates were dried at 110° C. for 16 h, hereafter calcined at 500° C. for 2 h. The Ag content of the sample was analyzed by ICP as 2.2 wt %. The carrier contained 88 wt % Y$_2$O$_3$ and 12 wt % Al$_2$O$_3$. For the catalytic test, the extrudates were crushed to a particle size of 150-300 μm. The results are shown in Table 4.

TABLE 4

2.2 wt % Ag/Y$_2$O$_3$/Al$_2$O$_3$ Catalyst

| | | |
|---|---|---|
| Temperature | ° C. | 185 |
| Pressure | bar | 28 |
| Catalyst volume | ml | 0.203 |
| Space velocity, wet | Nl/h/m3 | 73500 |
| INLET GAS COMPOSITION WET: | | |
| H$_2$ | % | 53.1 |
| CO | % | 27.4 |
| CO$_2$ | % | 0 |
| H$_2$O | % | 19.5 |
| HCN in wet gas | ppb | 11088 |
| HCOOH | ppb | 13422 |
| EXIT GAS COMPOSITION WET: | | |
| CO | % | 27.4 |
| HCN | ppb | 2180 |
| HCOOH | ppb | 1267 |
| CO ratio | | 1.000 |
| HCN ratio | | 0.197 |
| HCOOH ratio | | 0.094 |

It can be seen from Table 4 that the content of hydrogen cyanide, formic acid and formic acid derivatives was reduced.

Example 6

An Pd/Y$_2$O$_3$/Al$_2$O$_3$ catalyst was prepared as follows: 80 g Y$_2$O$_3$ was mixed with 50 g alumina gel and 2.8 g [Pd(NH$_3$)$_4$](HCO$_3$)$_2$ dissolved in 5 ml diluted nitric acid. The mixture was kneaded to a paste, which was extruded. The extrudates were dried at 110° C. for 16 h, hereafter calcined at 500° C. for 2 h. The Pd content of the sample was analyzed by ICP as 0.91 wt %. The carrier contained 88 wt % Y$_2$O$_3$ and 12 wt % Al$_2$O$_3$. For the catalytic test, the extrudates were crushed to a particle size of 150-300 μm. The results are shown in Table 5.

TABLE 5

0.91 wt % Pd/Y$_2$O$_3$/Al$_2$O$_3$ Catalyst

| | | |
|---|---|---|
| Temperature | ° C. | 185 |
| Pressure | bar | 28 |
| Catalyst volume | ml | 0.202 |
| Space velocity, wet | Nl/h/m3 | 73900 |
| INLET GAS COMPOSITION WET: | | |
| H$_2$ | % | 53.1 |
| CO | % | 27.4 |
| CO$_2$ | % | 0 |
| H$_2$O | % | 19.5 |
| HCN in wet gas | ppb | 11088 |
| HCOOH | ppb | 13422 |
| EXIT GAS COMPOSITION WET: | | |
| CO | % | 27.4 |
| HCN | ppb | 1391 |
| HCOOH | ppb | 1405 |
| CO ratio | | 1.000 |
| HCN ratio | | 0.125 |
| HCOOH ratio | | 0.105 |

It can be seen from Table 5 that the content of hydrogen cyanide, formic acid and formic acid derivatives was reduced.

Example 7

An Ag/CeO$_2$/ZrO$_2$ catalyst was prepared as follows: 580 g Ce(NO$_3$)$_3$.6H$_2$O was dissolved in water to a total volume of 400 ml. A solution of 70 wt % $Zr(OCH(CH_3)_2)_4$ in 1-propanol (160 g) was diluted to a total volume of 600 ml with 2-propanol. The aqueous solution was quickly added to the alcohol solution during turbo mixing. The precipitate was filtered off, washed, dried and calcined at 500° C. for 5 h. Hereafter the support was impregnated with an aqueous solution of AgNO3 to incipient wetness. The catalyst was dried at 120° C. and calcined at 450° C. for 2 h. The Ag content of the sample was analyzed by ICP as 1.5 wt %. The carrier contained 85 wt % $CeO_2$ and 15 wt % $ZrO_2$. For the catalytic test, the extrudates were crushed to a particle size of 150-300 μm. The results are shown in Table 6.

TABLE 6

| 1.5 wt % Ag/CeO₂/ZrO₂ Catalyst: | | |
| --- | --- | --- |
| Temperature | deg C. | 185 |
| Pressure | bar | 28 |
| Catalyst volume | ml | 0.203 |
| Space velocity, wet | Nl/h/m3 | 73700 |
| INLET GAS COMPOSITION WET: | | |
| H₂ | % | 53.1 |
| CO | % | 27.4 |
| CO₂ | % | 0 |
| H₂O | % | 19.5 |
| HCN in wet gas | ppb | 11088 |
| HCOOH | ppb | 13422 |
| EXIT GAS COMPOSITION WET: | | |
| CO | % | 27.4 |
| HCN | ppb | 817 |
| HCOOH | ppb | 158 |
| CO ratio | | 1.000 |
| HCN ratio | | 0.074 |
| HCOOH ratio | | 0.012 |

It can be seen from Table 6 that the content of hydrogen cyanide, formic acid and formic acid derivatives was reduced.

Example 8

A $Pt/CeO_2/ZrO_2$ catalyst was prepared as follows: 580 g $Ce(NO_3)_3.6H_2O$ was dissolved in water to a total volume of 400 ml. A solution of 70 wt % $Zr(OCH(CH_3)_2)_4$ in 1-propanol (160 g) was diluted to a total volume of 600 ml with 2-propanol. The aqueous solution was quickly added to the alcohol solution during turbo mixing. The precipitate was filtered off, washed, dried and calcined at 500° C. for 5 h. Hereafter the support was impregnated with an aqueous solution of [Pt (NH₃)₄](HCO₃)₂ to incipient wetness. The catalyst was dried at 120° C. and calcined at 450° C. for 2 h. The Pt content of the sample was analyzed by ICP as 3.4 wt %. The carrier contained 85 wt % $CeO_2$ and 15 wt % $ZrO_2$. For the catalytic test, the extrudates were crushed to a particle size of 150-300 μm. The results are shown in Table 7.

TABLE 7

| 3.4 wt % Pt/CeO₂/ZrO₂ Catalyst | | |
| --- | --- | --- |
| Temperature | ° C. | 185 |
| Pressure | bar | 28 |
| Catalyst volume | ml | 0.204 |
| Space velocity, wet | Nl/h/m3 | 73300 |
| INLET GAS COMPOSITION WET: | | |
| H₂ | % | 53.1 |
| CO | % | 27.4 |
| CO₂ | % | 0 |
| H₂O | % | 19.5 |
| HCN in wet gas | ppb | 11088 |
| HCOOH | ppb | 13422 |
| EXIT GAS COMPOSITION WET: | | |
| CO | % | 27.4 |
| HCN | ppb | 455 |
| HCOOH | ppb | 6825 |
| CO ratio | | 1.000 |
| HCN ratio | | 0.041 |
| HCOOH ratio | | 0.508 |

It can be seen from Table 7 that the content of hydrogen cyanide, formic acid and formic acid derivatives was reduced.

Example 9

An $Ag/Al_2O_3$ catalyst was prepared as follows: 50 g $Al_2O_3$ extrudates were impregnated to incipient wetness with a solution of 1.58 g $AgNO_3$ in 37.5 ml $H_2O$. The sample was dried at 110° C., hereafter calcined at 500° C. for 2 h. The Ag content of the sample was analyzed by ICP as 1.9 wt %. For the catalytic test, the extrudates were crushed to a particle size of 150-300 μm. The results are shown in Table 8.

TABLE 8

| 1.9 wt % Ag/Al₂O₃ Catalyst | | |
| --- | --- | --- |
| Temperature | ° C. | 185 |
| Pressure | bar | 11 |
| Catalyst volume | ml | 0.315 |
| Space velocity, wet | Nl/h/m3 | 50100 |
| INLET GAS COMPOSITION WET: | | |
| H₂ | % | 50.4 |
| CO | % | 26.0 |
| CO₂ | % | 0 |
| H₂O | % | 23.6 |
| HCN in wet gas | ppb | 9777 |
| HCOOH | ppb | 17032 |
| EXIT GAS COMPOSITION WET: | | |
| CO | % | N/A |
| HCN | ppb | 6879 |
| HCOOH | ppb | 8260 |
| CO ratio | | N/A |
| HCN ratio | | 0.704 |
| HCOOH ratio | | 0.485 |

It can be seen from Table 8 that the content of hydrogen cyanide, formic acid and formic acid derivatives was reduced.

Example 10

An $Pd—Pt/Al_2O_3$ catalyst was prepared as follows: 50 g $Al_2O_3$ extrudates were impregnated to incipient wetness with a solution of 0.68 g [Pd(NH₃)₄](HCO₂)₂ and 0.28 g [Pt (NH₃)₄](HCO₃)₂ in 37.5 ml $H_2O$. The sample was dried at 110° C., hereafter calcined at 500° C. for 2 h. The metal content of the sample was analyzed by ICP as 0.49 wt % Pd and 0.28 wt % Pt. For the catalytic test, the extrudates were crushed to a particle size of 150-300 μm. The results are shown in Table 9.

TABLE 9

| 0.49 wt % Pd-0.28 wt % Pt/Al$_2$O$_3$ Catalyst | | |
|---|---|---|
| Temperature | ° C. | 185 |
| Pressure | bar | 28 |
| Catalyst volume | ml | 0.326 |
| Space velocity, wet | Nl/h/m3 | 45800 |
| INLET GAS COMPOSITION WET: | | |
| H$_2$ | % | 53.1 |
| CO | % | 27.4 |
| CO$_2$ | % | 0 |
| H$_2$O | % | 19.5 |
| HCN in wet gas | ppb | 7753 |
| HCOOH | ppb | 13422 |
| EXIT GAS COMPOSITION WET: | | |
| CO | % | 27.4 |
| HCN | ppb | 2093 |
| HCOOH | ppb | 2535 |
| CO ratio | | 1.000 |
| HCN ratio | | 0.270 |
| HCOOH ratio | | 0.189 |

It can be seen from Table 9 that the content of hydrogen cyanide, formic acid and formic acid derivatives was reduced.

Example 11

An Ag/ZnO catalyst was prepared as follows: 100 g ZnO extrudates were impregnated to incipient wetness with a solution of 3.16 g AgNO$_3$ in 35.0 ml H$_2$O. The sample was dried at 110° C., hereafter calcined at 500° C. for 2 h. The Ag content of the sample was analyzed by ICP as 2.0 wt %. For the catalytic test, the extrudates were crushed to a particle size of 150-300 µm. The results are shown in Table 10.

TABLE 10

| 2.0 wt % Ag/ZnO Catalyst | | |
|---|---|---|
| Temperature | ° C. | 185 |
| Pressure | bar | 28 |
| Catalyst volume | ml | 0.173 |
| Space velocity, wet | Nl/h/m3 | 86700 |
| INLET GAS COMPOSITION WET: | | |
| H$_2$ | % | 53.2 |
| CO | % | 27.4 |
| CO$_2$ | % | 0 |
| H$_2$O | % | 19.4 |
| HCN in wet gas | ppb | 7714 |
| HCOOH | ppb | 13354 |
| EXIT GAS COMPOSITION WET: | | |
| CO | % | 27.4 |
| HCN | ppb | 816 |
| HCOOH | ppb | 4268 |
| CO ratio | | 1.000 |
| HCN ratio | | 0.106 |
| HCOOH ratio | | 0.320 |

It can be seen from Table 10 that the content of hydrogen cyanide, formic acid and formic acid derivatives was reduced.

Example 12

A Pd/MoO$_3$/Al$_2$O$_3$ catalyst was prepared as follows: 220 g Al$_2$O$_3$ extrudates were added to a suspension of 108 g MoO$_3$ in 700 ml H$_2$O. The mixture was heated to reflux for 16 h causing absorption of MoO$_3$ on the Al$_2$O$_3$ surface. The extrudates were isolated by filtration, and dried at 110° C. and calcined at 450° C. for 2 h. Hereafter 100 g MoO$_3$/Al$_2$O$_3$ extrudates were impregnated to incipient wetness with a solution of [Pd(NH$_3$)$_4$](HCO$_3$)$_2$ in diluted nitric acid. The sample was dried at 110° C. and calcined at 500° C. for 2 h. The Pd content of the sample was analyzed by ICP as 0.87 wt %. For the catalytic test, the extrudates were crushed to a particle size of 150-300 µm. The results are shown in Table 11.

TABLE 11

| 0.87 wt % Pd/MoO$_3$/Al$_2$O$_3$ Catalyst | | |
|---|---|---|
| Temperature | ° C. | 185 |
| Pressure | bar | 28 |
| Catalyst volume | ml | 0.237 |
| Space velocity, wet | Nl/h/m3 | 63400 |
| INLET GAS COMPOSITION WET: | | |
| H$_2$ | % | 53.2 |
| CO | % | 27.4 |
| CO$_2$ | % | 0 |
| H$_2$O | % | 19.4 |
| HCN in wet gas | ppb | 7714 |
| HCOOH | ppb | 13354 |
| EXIT GAS COMPOSITION WET: | | |
| CO | % | 27.4 |
| HCN | ppb | 59 |
| HCOOH | ppb | 970 |
| CO ratio | | 1.000 |
| HCN ratio | | 0.008 |
| HCOOH ratio | | 0.073 |

It can be seen from Table 11 that the content of hydrogen cyanide, formic acid and formic acid derivatives was reduced.

The invention claimed is:

1. A process for a reduction in the amount of sulphur compounds, hydrogen cyanide, formic acid and formic acid derivatives in synthesis gas comprising these compounds, the process comprising the steps of:
    contacting the synthesis gas with a sulphur absorbent comprising material and thereafter with a catalyst comprising one or more metals selected from the group consisting of silver, gold, copper, palladium, platinum and their mixtures and supported on a carrier comprising at least one of the oxides of scandium, yttrium, lanthanum, cerium, titanium, zirconium, aluminium, zinc, chromium and molybdenum, to reduce the amount of the sulphur compounds from the synthesis gas; and
    subsequently, converting hydrogen cyanide to ammonia and carbon dioxide, and converting formic acid and its derivatives to carbon dioxide and hydrogen, to reduce the amount of the hydrogen cyanide, formic acid and formic acid derivatives in the synthesis gas,
    wherein the steps of reducing the amount of sulphur compounds, hydrogen cyanide, formic acid and formic acid derivatives in the synthesis gas take place without promoting methanation or water gas shift reaction.

2. A process according to claim 1, wherein the sulphur absorbent comprising material comprises zinc oxide or titanium oxide or their mixtures.

3. A process according to claim 2, wherein the sulphur absorbent comprising material comprises zinc oxide promoted with alumina.

4. A process according to claim 2, wherein the catalyst comprises silver supported on an oxide of zinc and the sulphur absorbent comprising material comprises zinc oxide.

5. A process according to claim 1, wherein the sulphur absorbent comprising material comprises zinc oxide and the catalyst comprises silver supported on a carrier comprising at least one of the oxides of titanium and zirconium.

6. A process according to claim 1, wherein the synthesis gas is contacted with the sulphur absorbent comprising material and thereafter the catalyst at temperatures ranging from 150° C. to 400° C. and pressures ranging from 1-100 bars.

7. A process according to claim 1, wherein the synthesis gas after reduction of the amount of sulphur compounds, hydrogen cyanide, formic acid and formic acid derivatives, is cooled and separated into a cleaned synthesis gas stream and a condensate stream.

8. A process according to claim 1, wherein the catalyst is produced by impregnation of the carrier with the one or more metals followed by drying and calcining, or by mixing and kneading the carrier with the one or more metals followed by extrusion and calcination.

9. A process according to claim 8, wherein the one or more metals are in the form of an aqueous solution.

10. A process for the preparation of methanol, dimethyl ether and/or hydrocarbons in gaseous or liquid form from synthesis gas, the process comprising the steps of:
contacting synthesis gas comprising sulphur compounds, hydrogen cyanide, formic acid and formic acid derivatives, with a sulphur absorbent comprising material and thereafter with a catalyst comprising one or more metals selected from the group consisting of silver, gold, copper, palladium, platinum and their mixtures and supported on a carrier comprising at least one of the oxides of scandium, yttrium, lanthanum, cerium, titanium, zirconium, aluminium, zinc, chromium and molybdenum, to reduce the amount of the sulphur compounds from the synthesis gas;
subsequently, converting hydrogen cyanide to ammonia and carbon dioxide, and converting formic acid and its derivatives to carbon dioxide and hydrogen to obtain a synthesis gas from which the amount of sulphur compounds, hydrogen cyanide, formic acid and formic acid derivatives has been reduced; and
further processing the obtained synthesis gas to methanol, dimethyl ether and/or hydrocarbons in gaseous or liquid form,
wherein the steps of reducing the amount of sulphur compounds, hydrogen cyanide, formic acid and formic acid derivatives in the synthesis gas take place without promoting methanation or water gas shift reaction.

11. A process for the preparation of hydrocarbons in liquid form from synthesis gas, the process comprising the steps of:
contacting synthesis gas comprising sulphur compounds, hydrogen cyanide, formic acid and formic acid derivatives, with a sulphur absorbent comprising material and thereafter with a catalyst comprising one or more metals selected from the group consisting of silver, gold, copper, palladium, platinum and their mixtures and supported on a carrier comprising at least one of the oxides of scandium, yttrium, lanthanum, cerium, titanium, zirconium, aluminium, zinc, chromium and molybdenum, to reduce the amount of the sulphur compounds from the synthesis gas;
subsequently, converting hydrogen cyanide to ammonia and carbon dioxide, and converting formic acid and its derivatives to carbon dioxide and hydrogen to obtain a synthesis gas from which the amount of sulphur compounds, hydrogen cyanide, formic acid and formic acid derivatives has been reduced; and
further processing the obtained synthesis gas to hydrocarbons in liquid form by the Fischer-Tropsch process,
wherein the steps of reducing the amount of sulphur compounds, hydrogen cyanide, formic acid and formic acid derivatives in the synthesis gas take place without promoting methanation or water gas shift reaction.

* * * * *